United States Patent [19]
Troyer

[11] Patent Number: 6,139,089
[45] Date of Patent: Oct. 31, 2000

[54] VEHICLE PANEL

[75] Inventor: Philip W. Troyer, Middlebury, Ind.

[73] Assignee: Coachmen Industries, Inc., Elkhart, Ind.

[21] Appl. No.: 09/184,451

[22] Filed: Nov. 2, 1998

[51] Int. Cl.[7] ....................................... B60J 1/20
[52] U.S. Cl. ...................... 296/180.1; 296/151; 296/191; 280/847; 280/848
[58] Field of Search ................................ 296/180.1, 191, 296/151; 280/209, 847, 848, 154, 163; 428/31

[56] References Cited

U.S. PATENT DOCUMENTS

| | | | |
|---|---|---|---|
| 4,784,430 | 11/1988 | Biermacher | 296/198 |
| 5,769,439 | 6/1998 | Thompson | 280/163 |
| 5,806,869 | 9/1998 | Richards | 296/151 |

OTHER PUBLICATIONS

Merriam–Webster's Collegiate Dictionary 10th Ed., p. 4, Jan. 1993.

*Primary Examiner*—D. Glenn Dayoan
*Assistant Examiner*—Greg Blankenship
*Attorney, Agent, or Firm*—Price, Heneveld, Cooper, DeWitt & Litton

[57] ABSTRACT

A molded polymeric trim panel has an upper and a lower edge. The upper edge includes a surface for receiving an adhesive for attachment of the upper edge of the panel to a support surface on a vehicle. In some embodiments, the trim panel further includes integrally molded spaced projections including slots or apertures for receiving conventional fasteners for providing for tolerance variations from vehicle to vehicle for installation. The resultant panel structure attaches either as original equipment to the vehicle or gloves over an existing trim panel. In a preferred embodiment, the upper edge of the panel includes spacing lands for providing clearance for vehicle doors once installed.

3 Claims, 4 Drawing Sheets

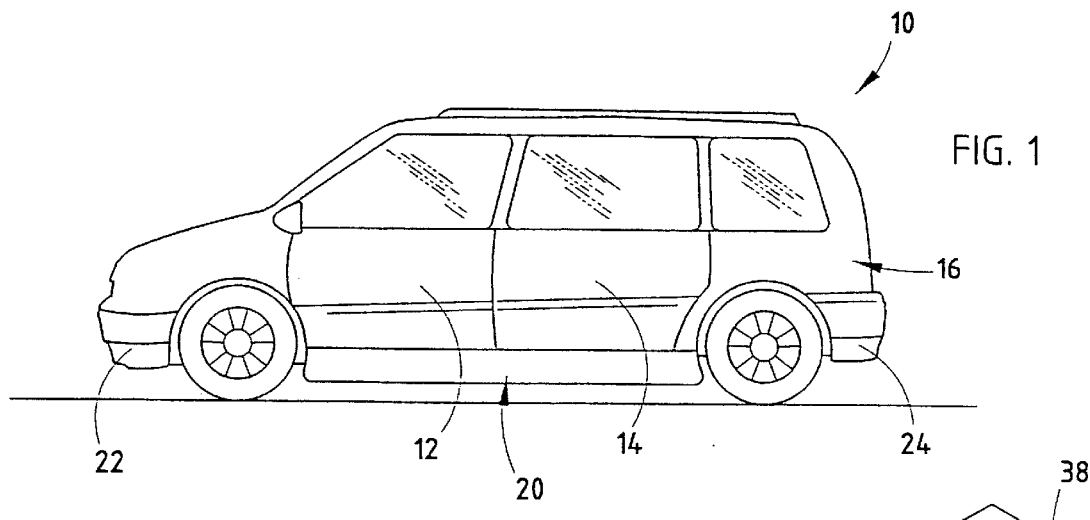
FIG. 1
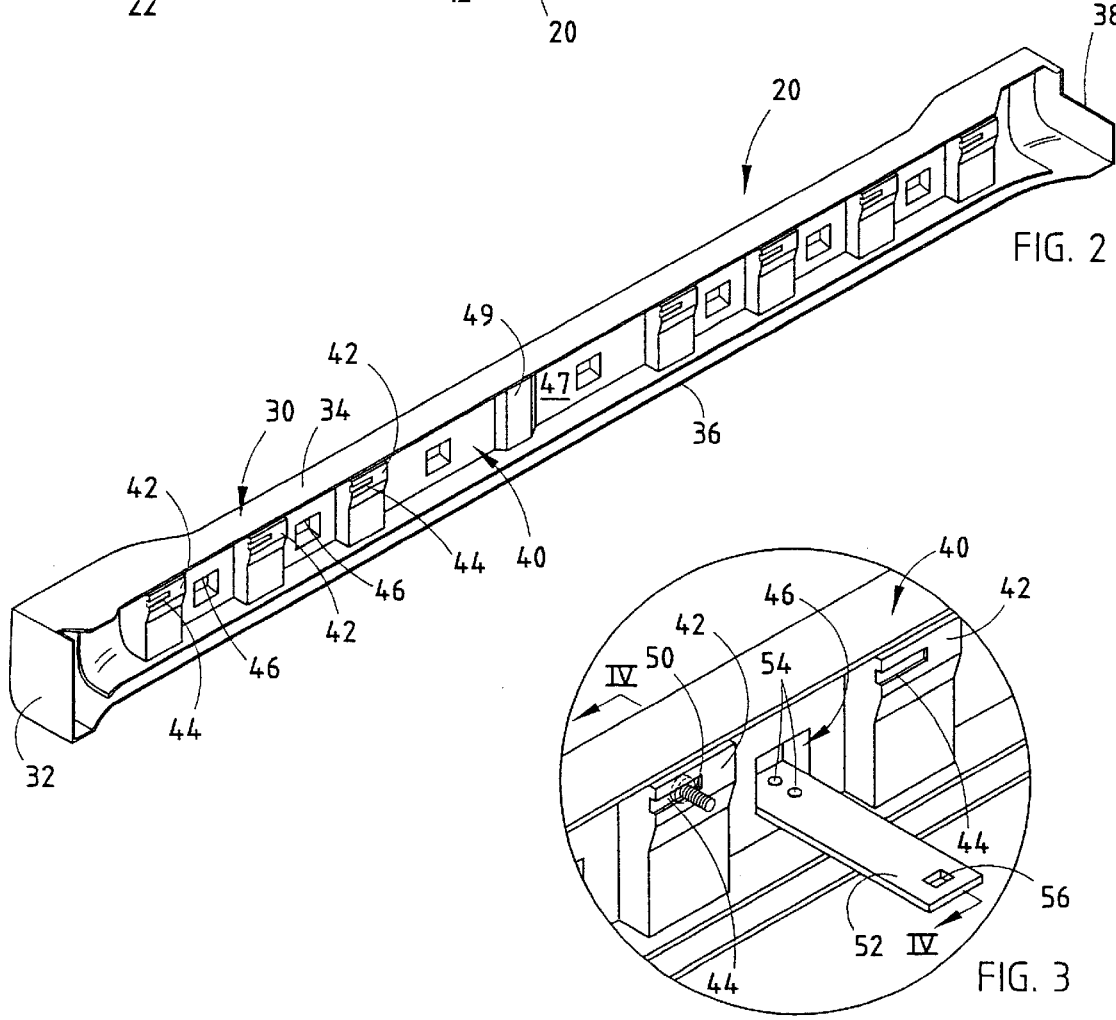
FIG. 2
FIG. 3

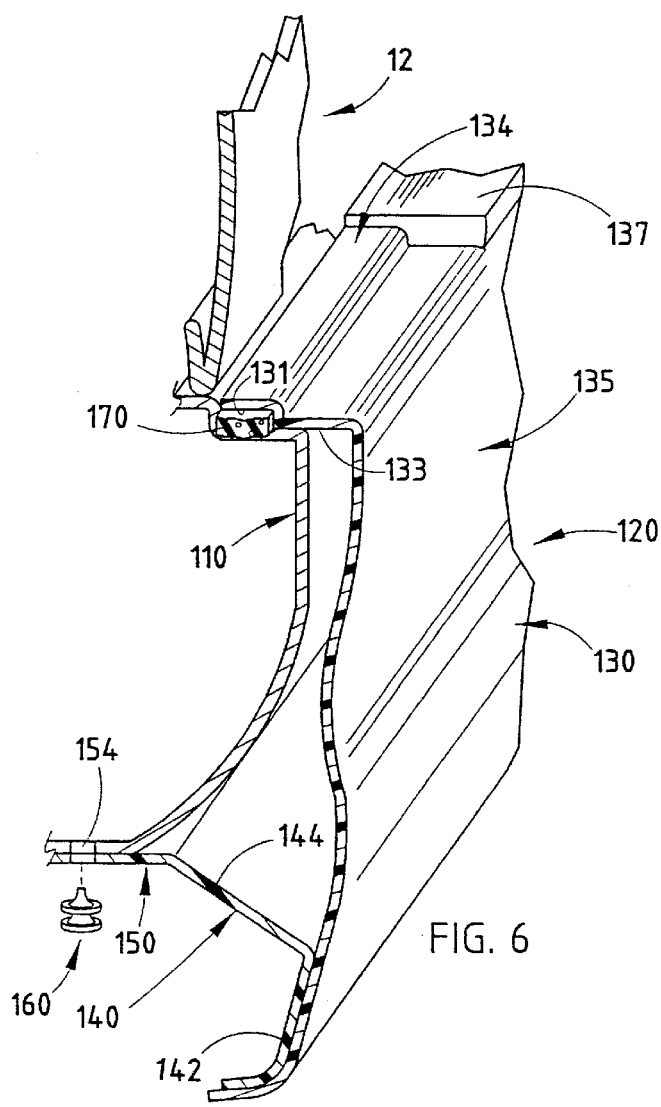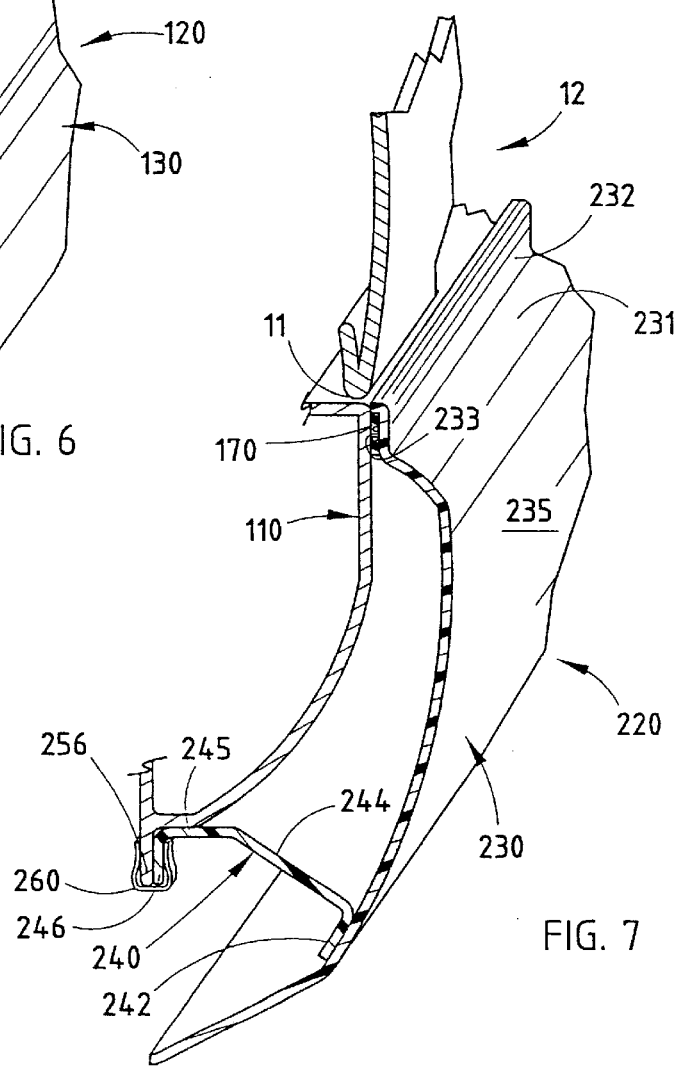

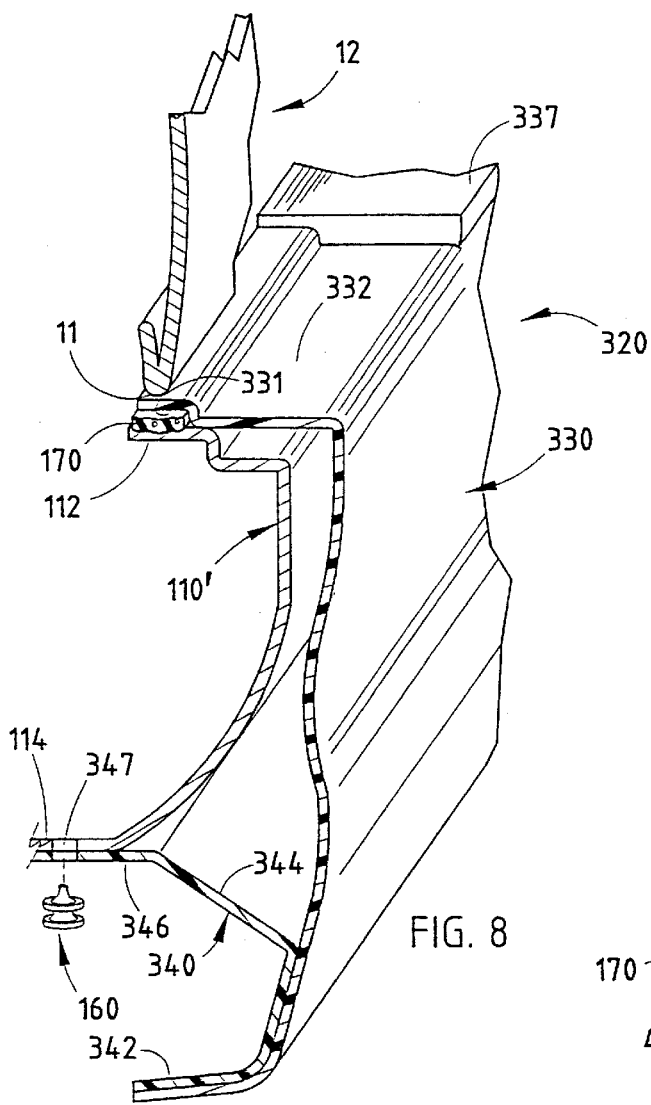
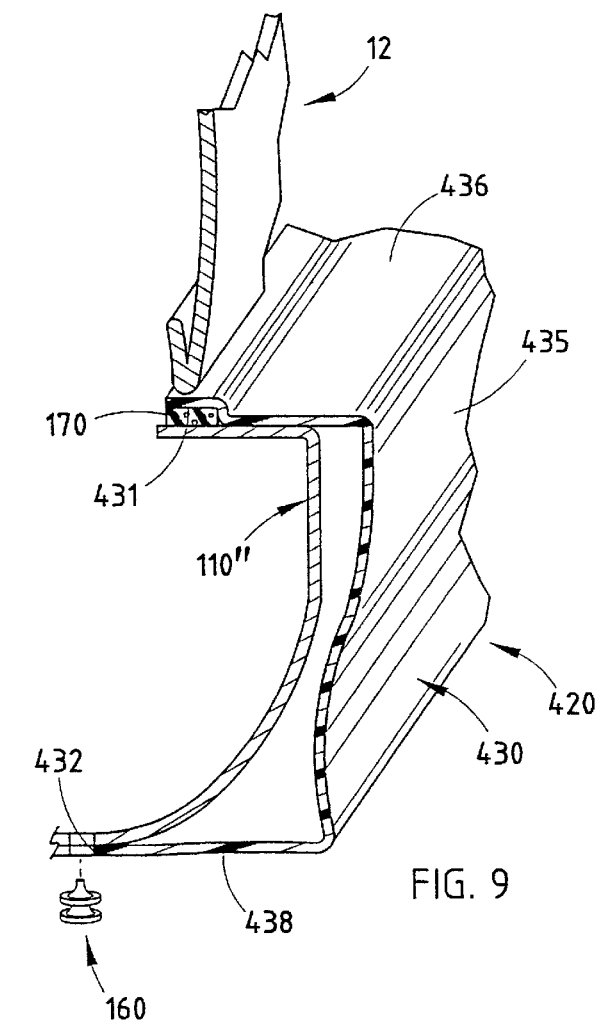

VEHICLE PANEL

BACKGROUND OF THE INVENTION

The present invention relates to vehicle panels and particularly to external trim panels.

Vehicle trim panels, such as rocker panels or ground effect panels at the front or the rear of a vehicle have in the past been made of sheet metal and typically attached to the vehicle by spot welding, riveting, or other conventional fastening means. In recent years, such panels have been made of molded polymeric materials, such as ABS, and finished to conform to the appearance of the panels to the vehicle exterior. Such panels have typically been attached as original equipment manufactured (O.E.M.) panels by a variety of fastening techniques including metal tangs and brackets extending from the inner surface of the molded panel facing the vehicle and including attachment apertures for receiving standard fasteners, such as rivets or threaded fasteners, for attaching the panel to the vehicle. Such metal attachments typically were spaced along the length of the panel and frequently required numerous separate vertically and horizontally spaced mounting members for attachment of the upper and lower areas of the panels.

Also, in recent years, add-on after-market decorative panels, such as rocker panels, spoilers and the like have been employed for attachment to vehicles to improve the appearance, performance or otherwise decorate the vehicle exterior. Such, molded polymeric rocker panels have included metallic fastening straps and brackets at spaced intervals along the added-on rocker panel which required careful alignment for attachment to existent rocker panels.

Although such add-on panels provided the desired appearance for a vehicle modification, the requirement of a plurality of aligned fasteners separately attached to the molded polymeric add-on panel together with the need for multiple fasteners and careful alignment of the members resulted in assembly problems, surface imperfections and costly production steps. Thus, there exists a need for an improved trim panel construction which reduces the cost of manufacturing and assembly to a vehicle and one which can be employed for either OEM or after-market use.

SUMMARY OF THE INVENTION

The trim panel of the present invention overcomes the difficulties of the prior art by providing a molded polymeric panel having, in some embodiments, inner and outer sections with an outer trim section integrally molded and seamless and defining an upper and a lower edge with an upper edge which, in some embodiments, includes spacing lands for providing clearance for vehicle doors once installed. In all embodiments, the panel includes a surface for receiving an adhesive for attachment of the upper edge of the panel to a first support surface on the vehicle. The trim panel further includes integrally molded projections which eliminate the need for separate mounting brackets with the integrally molded projections including slots or apertures for receiving conventional fasteners to allow for tolerance variations from vehicle to vehicle and facilitating installation. The resultant panel structure attaches either as original equipment to the vehicle or gloves over an existing trim panel by use of the continuous adhesive along the upper edge. Spaced hidden fasteners extend through the lower projections to provide a relatively inexpensive trim panel and one which is easily installed with fewer tolerance problems and less prone to failure due to stress points caused by contraction and expansion of prior art trim panels made of different materials.

These and other features, objects and advantages of the present invention will become apparent upon reading the following description thereof together with reference to the accompanying drawings.

BRIEF DESCRIPTION OF THE DRAWINGS

FIG. 1 shows a vehicle having a trim panel embodying the present invention installed thereon;

FIG. 2 is a perspective view of one of the trim panels employed on the vehicle shown in FIG. 1, shown partially assembled;

FIG. 3 is an enlarged perspective view of a section of the trim panel shown in FIG. 2, shown in its assembled state;

FIG. 6 is an enlarged fragmentary perspective view, partly in cross section, taken along section lines VI—VI of FIG. 5;

FIG. 7 is an enlarged fragmentary perspective view, partly in cross section, of an alternative embodiment of the trim panel of the present invention;

FIG. 8 is an enlarged fragmentary perspective view, partly in cross section, of yet another embodiment of the trim panel of the present invention; and FIG. 9 is an enlarged fragmentary perspective view, partly in cross section, of a still further embodiment of the trim panel of the present invention.

DETAILED DESCRIPTION OF THE PREFERRED EMBODIMENT

Figure 4:
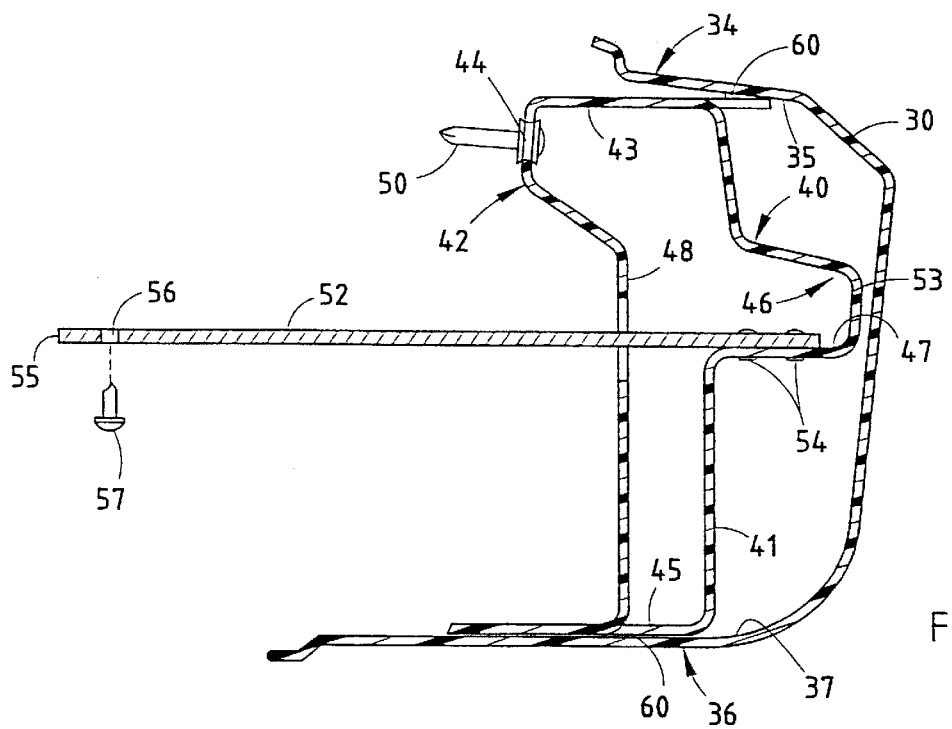
FIG. 4 is a vertical cross-sectional view of the trim panel shown in FIGS. 1–3 taken along section lines IV—IV in FIG. 3.

Referring initially to FIG. 1, there is shown a vehicle 10, such as a minivan or sports utility vehicle, which includes in the embodiment shown, four doors including a front driver's door 12, a rear passenger door 14 and a conventional chassis on which the body 16 of the vehicle is mounted. The body 16 conventionally includes a sheet metal outer skin supported by the vehicle frame which is attached to the chassis together with the other typical mechanical vehicle equipment. The lower edge of the vehicle may be trimmed by a rocker panel 20 extending below the doors 12 and 14 and front and rear spoilers 22 and 24, respectively, which add a decorative appearance to the lower edge of the vehicle body 16 as well as, in some vehicles, provide air dams or spoilers to channel air either for improving cooling to certain parts of the vehicle, for aerodynamics, or for appearance. The shape of the panels 20, 22 and 24 will vary depending upon the vehicle to which they are attached. Their formation and attachment structure, however, share a common construction. The construction of the first embodiment of the rocker panel 20 for a vehicle 10, shown in FIG. 1, is shown in detail in FIGS. 2–4 now described.

Referring to FIG. 2, there is shown the inside of a right side rocker panel 20 used with the vehicle of FIG. 1. Panel 20 is shown partly assembled and includes an elongated outer shell 30 having a forward wall 32, a top 34, a lower edge 36 and a rear wall 38. Shell 30 is integrally molded, typically of a polymeric material such as ABS, which may have a thickness of about 0.100 inch or approximately 2 mm. In the preferred embodiment, the outer surface of the concave molded shell 30 is conventionally textured and colored to match the appearance of the vehicle either by spray coating or by utilizing material which is pigmented to match the appearance of the vehicle 10 on which the trim panel 20 is mounted. Positioned within the outer elongated shell 30 is an inner polymeric shell 40, integrally molded of a polymeric material preferably ABS having a thickness of approximately 0.100 inch or 2 mm. Shell 40 includes a plurality of integrally molded spaced mounting bosses 42 spaced along the length of inner shell 40, each including an elongated open-ended slot 44 allowing the trim panel 20 comprising the outer shell 30 and inner shell 40 to be mounted to fasteners 50 (FIGS. 3 and 4) which extend from either the frame of the vehicle, in the event the trim member 20 is an original equipment part, or from the existing rocker panel or other trim member of a vehicle, if the trim panel 20 is an add-on member. The utilization of elongated open-ended slots 44 extending generally horizontally allow significant tolerance control for the attachment of trim panel 20 to a vehicle support structure such that the horizontal spacing of fasteners 50 need not be critical. The inner shell 40 of trim panel 20 is attached, as best seen in FIG. 4, to the outer shell 30 by the adhesive strips 60 mounted to the inside surface 35 of upper wall 34 of the outer shell and the top inside surface 37 of the lower wall 36 of the outer shell 30. The adhesive can be any suitable adhesive which binds the two polymeric materials together. Alternatively, the outer and inner shells 30 and 40, respectively, may be secured to one another by other conventional welding or bonding processes, such as sonic welding.

The inner shell 40, in addition to mounting bosses 42 spaced therealong, includes alternately staggered mounting lands 46 interspersed between the mounting bosses 42 and to which a rocker panel support bracket 52 is secured. The mounting land 46 is best seen in FIG. 4 and includes a recessed pocket having a mounting surface 47 to which one end 53 of mounting bracket 52 is attached by means of rivets 54. The bracket 52 is preferably a flat metal strap suitably treated for the automotive environment and has an end 55 opposite end 53 with an aperture 56 extending therethrough for allowing a fastener, such as a threaded fastener or rivet, 57 to extend through the aperture 56 and attach the end of metal bracket 52 to the vehicle frame at spaced locations alternately staggered between fasteners 50 also extending from the vehicle support member. Thus, trim panel 20 is attached to the vehicle at a series of horizontally and vertically spaced locations which are alternately staggered along the length of the trim panel to mount the trim panel to the vehicle support structure.

As can be seen in FIG. 4, the inner shell 40 includes an outer wall 41 into which the mounting lands 46 are integrally molded approximately centered between an upper wall 43 and integral lower wall 45 which communicate with an inner wall 48 in which the mounting bosses 42 are integrally formed. As seen in FIG. 2, a vertical stiffener 49 may also be integrally molded between upper wall 43 and lower wall 45 to provide rigidity for trim panel 20 which may extend a significant length, sufficient to extend under the lower edges of the front and rear doors 12 and 14, respectively, of vehicle 10. In place of the metal support brackets 52 and the lands 42 with elongated open slots 44, alternative embodiments of their invention provide integral spaced mounting tangs as seen in FIGS. 5–9 now described.

Figure 5:
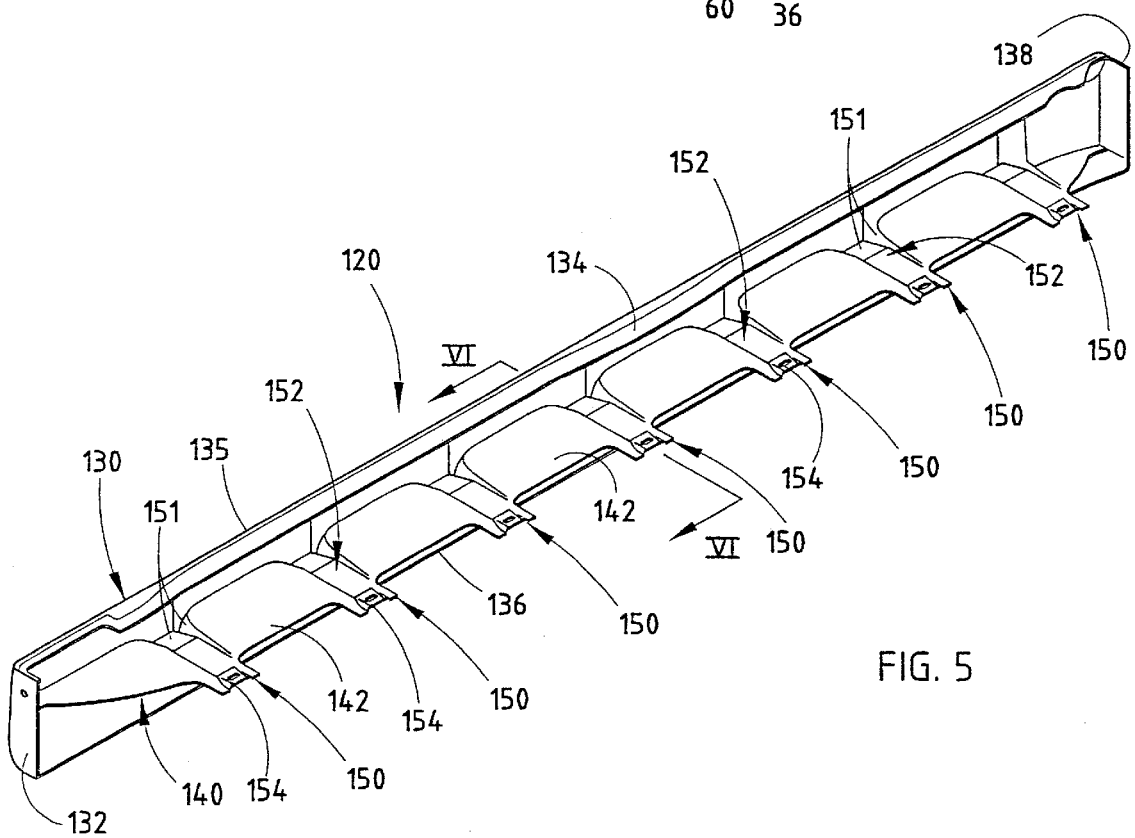
FIG. 5 is a perspective view of an alternative embodiment of a trim panel of the present invention.

FIGS. 5 and 6 are perspective views of the structure of a first alternative embodiment of the trim panel 20 and is identified by the reference numeral 120. Trim panel 120 is a rocker panel and includes an outer shell 130 with an upper surface wall 134, an outer skin 135 which is exposed to the outside of the vehicle when installed on a vehicle, a lower wall 136, and ends 132 and 138. In addition, the upper wall 134 may include, adjacent ends 132, 138, raised lands 137 (FIG. 6) which are spaced above the top surface of wall 134 a distance of approximately 0.100 inch to provide clearance for the lower edge of doors 12 and 14 of the vehicle. Thus, the panel 120 is dimensioned such that when installed on the vehicle the lands 137 which abut the lower edge of a fender, for example, assure clearance for the lower edge of the doors.

Panel 120 includes an inner shell 140 which is attached to outer trim shell 130 by sonic welding and/or adhesive bonding with the inner shell 140 including a plurality of integrally molded spaced mounting tangs 150 extending inwardly toward the vehicle and positioned to fit under the mounting channel of the vehicle frame in the event the trim panel 120 is an original equipment panel or under an existing rocker panel, as illustrated in FIG. 6, in the event the panel 120 is adapted for use for an after-market trim panel. Each tang is formed by a faceted integrally molded body 152 extending from the web-like horizontally extending upper wall 142 of inner shell 140. The faceted walls 151 forming bodies 152 of tangs 150 provide structural rigidity to the tangs 150. The end of each tang 150 includes an elongated slot 154 for receiving a fastener 160 (FIG. 6).

As best seen in the enlarged fragmentary perspective view of FIG. 6, the upper wall 134 of outer shell 130 includes a lower surface 133 having an elongated channel 131 formed therein for receiving automotive grade double-sided self-sticking adhesive tape 170 which fits within channel 131 and extends along the entire length of the upper wall 134 of the trim panel 120. In a preferred embodiment of the invention, the double-sided adhesive tape comprises a 3M automotive quality tape model 395OY having a width of approximately 0.5 inch and a thickness of 0.090 inch. As seen in FIG. 6, the mounting tangs 150 include slots 154 therein for receiving fasteners 160 which can be conventional plastic rivets commonly employed in the assembly of vehicle components. As also seen in FIG. 6, the trim panel 120 has a vertical height significantly greater than that of the original equipment rocker panel 110 to provide a significantly vertically enhanced trim panel, such as a rocker panel, improving the appearance of the vehicle, its aerodynamic characteristics or, if desired, shaped to direct air flow to, for example, vehicle brakes and the like.

As in the first embodiment, the inner and outer shells 130 and 140 are each integrally molded of a polymeric material such as ABS having a thickness of approximately 0.100 inch with the inner and outer shells joined to one another, as seen in FIGS. 5 and 6, to form a continuous elongated trim panel. The integrally formed mounting tang 150 is spaced for a given vehicle installation to either attach to an existing rocker panel such as panel 110 shown in FIG. 6 or to a frame channel of a vehicle if the panel 120 is installed as original equipment.

As can be appreciated, by the utilization of integrally molded mounting tangs and a continuous strip of double-sided adhesive tape, the alignment of the rocker panel so-formed with respect to the vehicle is less critical, resulting in fewer assembly problems with the attachment of the trim panel 120 to a vehicle. In addition, by integrally molding the outer shell 130, surface imperfections found when separate mounting brackets of the prior art were attached to the outer rocker panel shell are eliminated as are the additional production steps in attaching separate brackets. By utilizing integrally molded inner and outer shells, the thickness of the material can be lessened and with the spaced faceted body mounting tangs 150 and web 142, sufficient structural rigidity is provided with a reduced thickness material. The trim panel 120 may take on a variety of configurations as shown in FIGS. 7–9 now briefly described.

In FIG. 7, a trim panel 220 is shown and, as in the prior embodiments, includes an outer shell 230 with an outer decorative surface 235 facing the exterior of the vehicle. In this embodiment, the trim panel 220 fits against the edge of an original rocker panel 110 below the edge 11 of one of the doors, such as door 12 also shown in FIG. 1. Shell 230 includes an upper inclined ledge 231 extending from the outer, generally vertical surface 235 terminating in an upwardly projecting lip 232 defining a channel 233 for receiving double-sided tape 170 of the same type described in connection with the FIG. 6 embodiment. Mounted to the outer shell 230 is an inner shell 240 which is sonically bonded to the outer shell 230 at spaced intervals therealong or otherwise adhesively bonded thereto. The inner shell 240 comprises a generally L-shaped member having a lower leg 242 secured to the inner surface of outer shell 230 and a central leg 244 extending upwardly and inwardly toward the vehicle. An upper leg 245 extends from legs 244 and terminates in a downwardly projecting lip 246 which can be aligned with the lower edge 256 of the vehicle sheet metal. The lower edge of trim panel 220 is mounted to vehicle 10 by utilizing a plurality of spaced spring clips 260 for securing the lower lip 246 of inner shell 240 to the lower edge 256 of the vehicle body. As in the embodiment shown in FIGS. 5 and 6, the embodiment shown in FIG. 7, therefore, is attached adhesively at its upper end to the vehicle by a continuous adhesive bonding and attached at spaced locations at a vertically spaced position below the upper adhesive attachment. In the embodiment shown in FIG. 7, the spring clips, which are of conventional construction, can be easily applied to the vehicle at any desired location to provide the attachment of the inner polymeric shell 240 to the existing vehicle. As in the previous embodiments, the outer shell 230 and inner shell 240 are integrally molded of polymeric material, such as ABS, having a thickness of about 0.100 inch or 2 mm.

In FIG. 8, yet another embodiment of a trim panel 320 is shown which, as in the previous embodiments, includes an outer shell 330 and an inner shell 340, each integrally made of a polymeric material such as ABS having a thickness of about 0.100 inch or 2 mm integrally molded by conventional molding process, such as vac-forming, as are the previous embodiments. The trim member 320, like panels 20, 120 and 220, also includes a spacing land 337 at opposite ends of the elongated rocker panel for providing clearance for the lower edge of a door, such as edge 11 of door 12. The embodiment of FIG. 8 is provided to glove over (i.e., fit over) an existing rocker panel, such as panel 110', shown in FIG. 8, and has a substantially wide upper surface 332. Thus, outer shell 330 has a top wall 332 which is substantially wider than in the previous embodiments and which includes an elongated channel 331 formed at its edge for receiving therein double-sided tape 170 of the same construction as tape 170 in the previous embodiments. Tape 170, thus, is attached to the lower surface of the channel 331 integrally formed with top wall 332 of outer shell 330 and, as in the other embodiments, includes a removable wax-impregnated backing strip protecting the adhesive surface prior to installation which is subsequently attached to the upper surface of wall 112 of rocker panel 110'. The inner shell 340 can be bonded to the outer shell 330 along its lower edge 342 utilizing an adhesive or by ultrasonic welding. Member 340 is generally reversed C-shaped having a central section 344 and an upper leg 346 with a plurality of spaced apertures 347 therealong to allow attachment of the end 346 to the lower wall 114 of the original rocker panel 110' utilizing press-fit plastic rivets 160. As in the embodiment shown in FIGS. 5–6 and FIGS. 7–8, the ends 346 of the inner shell 340 define a plurality of mounting tangs with webbing therebetween extending from the continuously molded inner shell 340 at spaced locations. Alternatively, the lower edges of the inner shells of each of the embodiments can be continuous walls, although additional material is required.

In yet another embodiment of the invention is shown in FIG. 9, a trim panel 420 is shown which does not include an inner shell but rather comprises a single shell 430 with an outer decorative, generally vertically extending surface 435 and integral upper and lower walls 436, 438. The upper wall 436 terminates in a ledge-defining channel 431 for receiving double-backed adhesive tape 170 of the same type as described in the previous embodiments and which extends continuously along the length of the trim panel 420 which can be in the form of a rocker such as shown in FIG. 5. The panel 420 is adapted to fit over an existent rocker panel 110'' and includes at its lower leg 438 a plurality of apertures 432 for receiving plastic push-on rivets 160 for attaching the lower leg 438 of shell 430 to the rocker panel 110''. Thus, panel 420 can enhance the shape configuration and depth of the existing rocker panel 110 and, as in the previous embodiments, includes a continuous adhesive connection to the existent vehicle structure along an upper edge thereof and a plurality of horizontally spaced fasteners positioned below the continuous adhesive attachment to the vehicle.

As seen by the various embodiments of the present invention, a vehicle trim panel can be provided as original equipment or as an addition to existing trim panels by gloving over (i.e., fitting over the top of) and attached to existing trim panels, such as rocker panels. As can be appreciated, for given vehicles and desired aesthetics or aerodynamics, the configuration of the outer surface of the trim panels can vary as can the dimensions to attach the trim panel to an existent vehicle body style. These and other modifications to the preferred embodiments of the invention as described herein can be made without departing from the spirit or scope of the invention as defined by the appended claims.

The invention claimed is:

1. A vehicle trim panel comprising:
   an outer concave ABS shell having a decorative outer surface and an inner surface, said outer shell including a channel along an upper edge thereof for receiving an adhesive for attaching said upper edge of said outer shell to a vehicle support member; and
   an inner ABS shell attached to said inner surface of said outer shell and including a plurality of spaced mounting tangs extending away from said outer surface of said outer shell toward a vehicle support structure for attaching said inner shell to a vehicle support member, within said outer shell and has a height less than the height of said outer shell and the thickness of said ABS material is about 0.100 inch, and wherein said tangs are formed in spaced relationship along an upper surface of said inner shell and include faceted walls to add rigidity to said tangs.

2. The trim panel as defined in claim 1 wherein said tangs are joined to each other by an integral web forming an upper surface of said inner shell.

3. The trim panel as defined in claim 2 wherein said tangs include apertures formed therein for receiving fasteners therethrough.

* * * * *